(12) United States Patent
Antoo et al.

(10) Patent No.: US 10,134,016 B2
(45) Date of Patent: Nov. 20, 2018

(54) REAL TIME FUNDING SOLUTION FOR MISCELLANEOUS INCOME

(71) Applicant: ADP, LLC, Roseland, NJ (US)

(72) Inventors: Nizam Antoo, San Carlos, CA (US); Michael T. Hosea, Rancho Cucamonga, CA (US); Maria Kirgan, Laguna Niguel, CA (US); Gary Lott, San Dimas, CA (US); Fernando C. Macalinao, Alta Loma, CA (US); Sumeet A. Palkar, Irvine, CA (US); Anthony Peculic, Studio City, CA (US); Hamid Qaasim, San Dimas, CA (US); Yin Zhang, Rancho Cucamonga, CA (US)

(73) Assignee: ADP, LLC, Roseland, NJ (US)

( * ) Notice: Subject to any disclaimer, the term of this patent is extended or adjusted under 35 U.S.C. 154(b) by 934 days.

(21) Appl. No.: 14/546,550

(22) Filed: Nov. 18, 2014

(65) Prior Publication Data

US 2016/0140520 A1 May 19, 2016

(51) Int. Cl.
*G06Q 40/00* (2012.01)
*G06Q 20/10* (2012.01)
(Continued)

(52) U.S. Cl.
CPC ............ *G06Q 20/10* (2013.01); *G06Q 20/20* (2013.01); *G06Q 20/34* (2013.01); *G06Q 20/356* (2013.01); *G06Q 40/125* (2013.12)

(58) Field of Classification Search
CPC ........ G06Q 20/10; G06Q 20/20; G06Q 20/34; G06Q 20/356; G06Q 40/125
(Continued)

(56) References Cited

U.S. PATENT DOCUMENTS 7,587,342 B2 * 9/2009 Neofytides ............ G06Q 20/02
705/26.44
7,809,641 B2 10/2010 Sanders et al.
(Continued)

FOREIGN PATENT DOCUMENTS

CA 2533310 A1 * 1/2005 ............ G06Q 20/04

OTHER PUBLICATIONS

Salehezadeh et al: "How Public Policies Affect Work and Marriage Incentives", Oklahoma Business Bulletin, Norman vol. 73, Iss. 1, Jan. 2005 (Year: 2005).*

(Continued)

*Primary Examiner* — Edward J Baird
(74) *Attorney, Agent, or Firm* — Anna L. Linne; Andrew M. Calderon; Roberts Mlotkowski Safran Cole & Calderon, P.C.

(57) ABSTRACT

Systems and processes for real-time instant funding solutions for miscellaneous income are disclosed. The method of funding miscellaneous income includes securely transmitting a funding information file or a real time funding transaction request with miscellaneous funding information to a funding card processing system using real-time web services APIs which are externally accessible by an external computing system, e.g., point of sale, time and labor or payroll system. The method further includes processing the funding information file with the funding card processing system, which includes at least identifying client information and a user receiving miscellaneous income contained within the miscellaneous funding information. The method further includes funding a payroll card of the identified user with the miscellaneous income received with the miscellaneous funding information of the funding information file.

8 Claims, 11 Drawing Sheets

(51) Int. Cl.
   *G06Q 20/34* (2012.01)
   *G06Q 20/20* (2012.01)
(58) Field of Classification Search
   USPC .................................................. 705/35–40
   See application file for complete search history.

(56) References Cited

U.S. PATENT DOCUMENTS

| | | | |
|---|---|---|---|
| 2002/0157974 A1* | 10/2002 | Krahn | G11B 20/00086 |
| | | | 206/308.1 |
| 2002/0184148 A1 | 12/2002 | Kahn et al. | |
| 2003/0053609 A1* | 3/2003 | Risafi | G06Q 20/04 |
| | | | 379/114.2 |
| 2003/0140001 A1 | 7/2003 | MacKlin et al. | |
| 2003/0222135 A1* | 12/2003 | Stoutenburg | G06Q 20/04 |
| | | | 235/379 |
| 2004/0049436 A1 | 3/2004 | Brand et al. | |
| 2005/0177496 A1* | 8/2005 | Blagg | G06Q 20/10 |
| | | | 705/39 |
| 2006/0069642 A1* | 3/2006 | Doran | G06Q 20/10 |
| | | | 705/39 |
| 2006/0136230 A1 | 6/2006 | Peichl et al. | |
| 2008/0021799 A1* | 1/2008 | Blowers | G06Q 40/02 |
| | | | 705/30 |
| 2011/0112940 A1 | 5/2011 | Marshall | |
| 2016/0371661 A1* | 12/2016 | Shah | G06Q 10/105 |

OTHER PUBLICATIONS

Unknown, "Aloha version 5.2 New Feature List", http://www.scribd.com/doc/164907891/Aloha-5-2-New-Features-List, Jun. 6, 2001, 4 pages.
Unknown, "EzPaycheck Payroll Software Offers New Features . . . Paychecks Quickly", http://www.1888pressrelease.com/print_pr.php?id=535838, uploaded Aug. 5, 2014, 5 pages.

* cited by examiner

IMPORTANT INFORMATION

Dear Client
Card Funding Filing Name:
Store ID:
Record Count: X
Beginning Balance
Reason for Failure:

| Account No./Employee ID | Employee Name | Funding Card No. | Reasons for Failure |
|---|---|---|---|
| | | | |
| | | | |

If you have any questions, please contact your representative.

FIG. 11

REAL TIME FUNDING SOLUTION FOR MISCELLANEOUS INCOME

TECHNICAL FIELD

The invention relates to funding solutions for miscellaneous income and, more particularly, systems and processes for real-time instant funding solutions for miscellaneous income.

BACKGROUND

Today, employers fund a payroll card with any amount one at a time through a web portal interface. The process requires payroll practitioners to manually submit funding requests for each employee thus potentially delaying and introducing errors to the process.

BRIEF DESCRIPTION OF THE DRAWINGS

The present invention is described in the detailed description which follows, in reference to the noted plurality of drawings by way of non-limiting examples of exemplary embodiments of the present invention.

FIGS. 8-11 show various user interfaces (UIs) generated by the systems and processes of the present invention.

SUMMARY OF THE INVENTION

Figure 1:
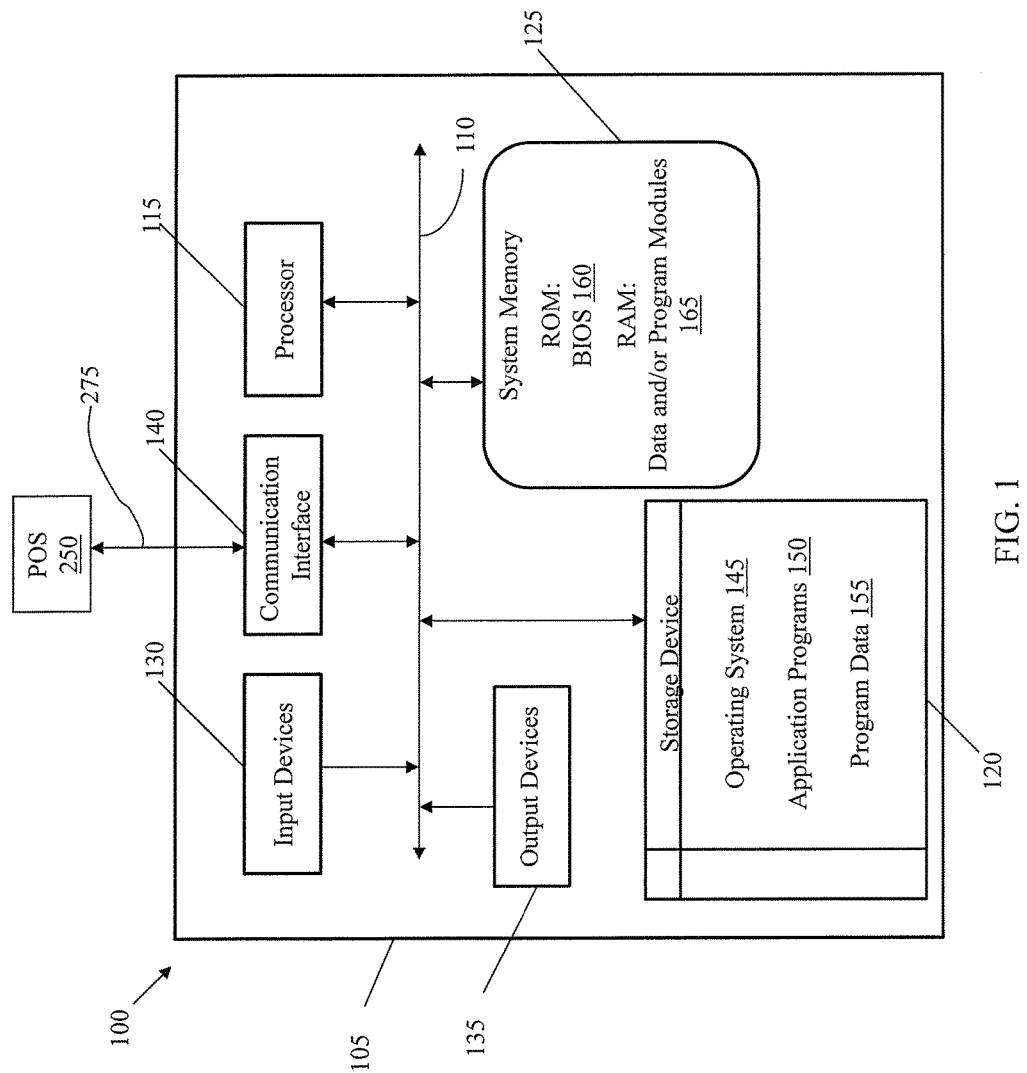
FIG. 1 is an illustrative architecture of a computing system implemented as embodiments of the present invention.

In an aspect of the invention, a method of funding miscellaneous income comprises securely transmitting a funding information file or a real time funding transaction request with miscellaneous funding information to a funding card processing system using real-time web services APIs which are externally accessible by an external computing system, e.g., point of sale, time and labor or payroll system. The method further comprises processing the funding information file with the funding card processing system, which includes at least identifying client information and a user receiving miscellaneous income contained within the miscellaneous funding information. The method further comprises funding a payroll card of the identified user with the miscellaneous income received with the miscellaneous funding information of the funding information file.

In another aspect of the invention, a computer system for funding of a payroll card comprises: a hardware memory device that stores program instructions; and a processor that executes the program instructions and causes the computer system to: securely transmit transaction information in a transaction file to a funding card processing system via a secure gateway and using real-time web services APIs which are externally accessible; process the transaction file by validating, interpreting and parsing the transaction file which includes a request for funding of a payroll card with miscellaneous income; receive a response and confirmation that the funding transaction has been complete; and post transactional results to an end user as one or more different reports.

In another aspect of the invention, a payroll card service system has computer program product comprising computer readable program instructions stored on computer readable storage medium. The computer readable program instructions cause the payroll card service system to: receive a funding information file with miscellaneous funding information through a secure transmission; and using real-time web services APIs which are externally accessible by a point of sale computing system. The processing of the funding information file includes: validating funding card information, client information and cardholder information within the funding information file; funding a payroll card associated with the validated funding card information and the cardholder information; and posting a notice of the funding and, if validation failed, information about the failed validation.

DETAILED DESCRIPTION OF ASPECTS OF THE INVENTION

The invention relates to funding solutions for miscellaneous income and, more particularly, to systems and processes for real-time instant funding solutions for miscellaneous income. Advantageously, the systems and processes provide retailers, restaurants, merchants and other employers with the technological capability of instantly funding miscellaneous income to an employees' payroll card such as an ALINE card by ADP® (ALINE card by ADP is a registered trademark of ADP LLC). Miscellaneous income can include, e.g., tips, per diem, commissions, bonuses, etc., and other payment types. The systems and processes of the real-time instant funding solutions also include the expanded technical capabilities of advanced calculation of deductions such as garnishment tax withholdings functionality, to name a few.

In embodiments, the systems and processes of the real-time instant funding solutions for miscellaneous income are fully automated and can support batch file processing. That is, the real-time instant funding solutions for miscellaneous income are implemented as a real-time automated solution, requiring no manual intervention, and which can be processed in batch processes thereby reducing time and cost. The real-time transactional processing is supportable through web service integration API's and real-time web service integration. The web service integration API's and real-time web service integration provides full bi-directional integration capability with internal wage Garnishments and HCM payroll platforms, as an example. Deductions are optional and can be configured for the client upon request. For payroll and tax year end reconciliation purposes, all miscellaneous income disbursed and deductions will flow back to the originating systems. Additional tip calculation capabilities such as including the option to calculate and disburse "make-up" pay where some states require minimum hourly wage thresholds can also be included as an option for the client.

Moreover, the systems and processes are implemented through secured data gateway services and/or a secure webservice such that network traffic can be securely transmitted. Network traffic can include, e.g., (i) client ID, (ii)

subclient ID, (iii) location ID, (iv) cardholder (employee) ID, (v) cardholder ABA/DDA, (vi) funding account number, (vii) account number, (viii) employee name and other information, and (ix) miscellaneous income amount, etc. For added convenience and security, additional capabilities include automatically searching and identifying the employee's account number to fund based on a single field which is a unique employee ID provided by clients with a single account number to originate funds from. Further technical capabilities include, for example, email notifications to clients, text message to employees and/or clients, and Point of Sale (POS) enablement, integrated with any known workforce management systems, time and labor management systems, payroll, point-of-sale and other management systems.

FIG. 1 is an illustrative architecture of a computing system 100 implemented as embodiments of the present invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing system 100 is configured to provide real-time instant funding solutions for miscellaneous income as described herein. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140. In embodiments, the storage device 120 can store transactional information for processing real-time transactions such as, e.g., (i) client ID, (ii) subclient ID, (iii) location ID, (iv) cardholder (employee) ID, (v) cardholder ABA/DDA, (vi) employer/employee funding account numbers, (vii) employee name and other information, and (viii) miscellaneous income amount, etc. As should be understood by those of skill in the art, ABA (American Banker's Association) is a bank routing number; whereas, DDA (Demand Deposit Account) is a cardholder's account number at the bank.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105 and providing the functionality and technical solutions provided by the systems and processes of the present invention, e.g., real-time instant funding solutions for miscellaneous income.

In embodiments, processor 115 interprets and executes the processes, steps, functions, and/or operations of the present invention, which may be operatively implemented by the computer readable program instructions. For example, processor 115 provides clients with the technical capability to leverage a corporate funding card as a value add pay medium to the ALINE card by ADP®. More specifically, processor 115 provides automatic and instant processing of miscellaneous income, e.g., tips, bonuses, to an employees' payroll card such as the ALINE card by ADP® implemented through secure connections/gateways with API implementations. Advantageously, this provides the employee with immediate or near immediate access to their miscellaneous income (tips, commission, per diem, etc.), as such income can be credited to their payroll card. This solution thus provides retailers, restaurants, merchants and other employees the capability to provide instant funding of miscellaneous income and other payments to their employees' payroll card as opposed to distributing cash or manually writing a check at the end of the day.

In embodiments, the automatic and instant processing can be provided in real-time, requiring no manual intervention. By way of example, the processing of the transactional amount of miscellaneous income can be triggered instantly at the time of receipt, at a point of sale terminal (POS) 250, e.g., when an employee is processing the payment amount from the customer, or through a global workforce management system. As described further herein, at such time, a tip or other miscellaneous income file can be created, keyed by ABA/DDA or an employee ID. This tip file (e.g., instant funding information file) can then be transferred automatically through proxy services 275 and other secure gateways with other identification information stored in the storage device 120, e.g., (i) client ID, (ii) subclient ID, (iii) location ID, (iv) cardholder (employee) ID, (v) cardholder ABA/DDA, (vi) employer/employee funding account numbers, (vii) employee name and other information, and (viii) miscellaneous income amount, etc. to back end systems, implementing APIs. Once received by the processing center, the miscellaneous income can be processed and credited to the employees' payroll card as described herein.

As should be understood by those of skill in the art, a proxy service is an application that runs on a server allowing administrators to pool internet connections and to filter websites and monitor Internet activities. To implement real-time processing, transactional processing is further supportable through webservice integration API's. Moreover, the systems and processes can be implemented through secured data gateway services and/or secured webservices gateway such that network traffic can be securely transmitted. The technical capabilities can further include email notifications, text messaging, POS integration (e.g., terminal 250) or any known workforce management systems, time and labor management systems, payroll, point-of-sale and other management systems integrated with the APIs, all of which can be integrated with the processes and systems of the invention.

The processor 115 also provides the technical capabilities of garnishment, deduction and tax collection functionality, to name a few, through a payroll database which can be represented as storage device 120. Specifically, as with ordinary income, e.g., payroll, processor 115 can calculate and automatically deduct from the miscellaneous income garnishments, tax collections and other deductions, e.g., healthcare expenses, etc., prior to funding the employees' payroll card.

In embodiments, processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention In embodiments, storage device 120 may store operating system 145, application programs 150, and program data 155 in accordance with aspects of the present invention.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof, in addition to any combination of other devices described with reference to the foregoing figures. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices 250 such as, for example, a server in a networked environment, e.g., cloud environment. For example, computing device 105 may be connected to remote devices or systems via one or more local area networks (LAN) and/or one or more wide area networks (WAN) using communication interface 140.

The computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
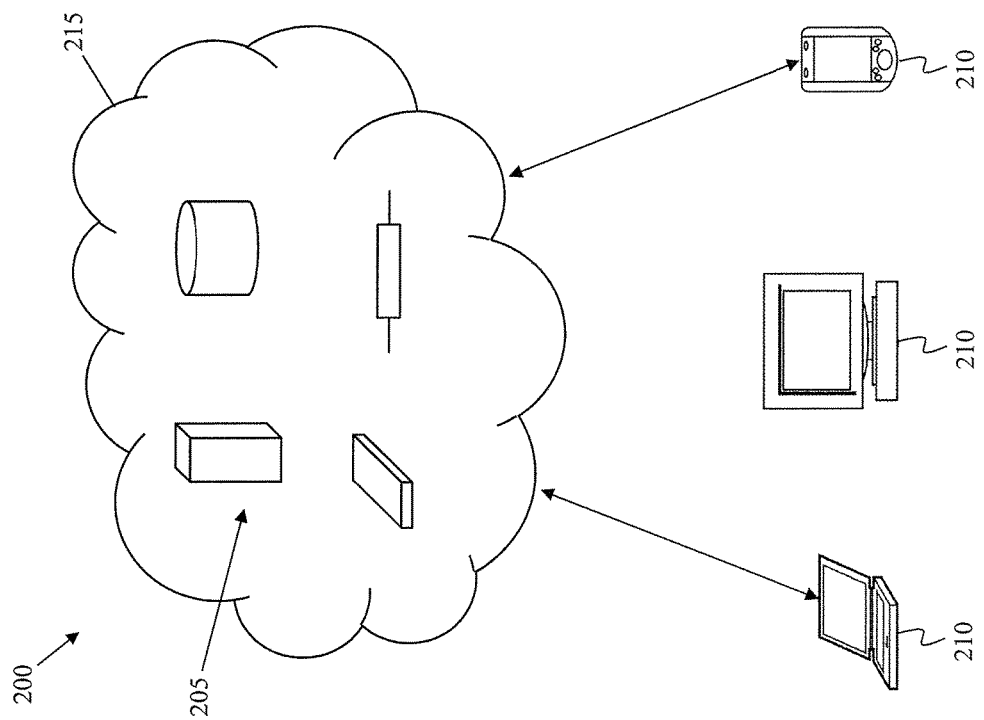
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
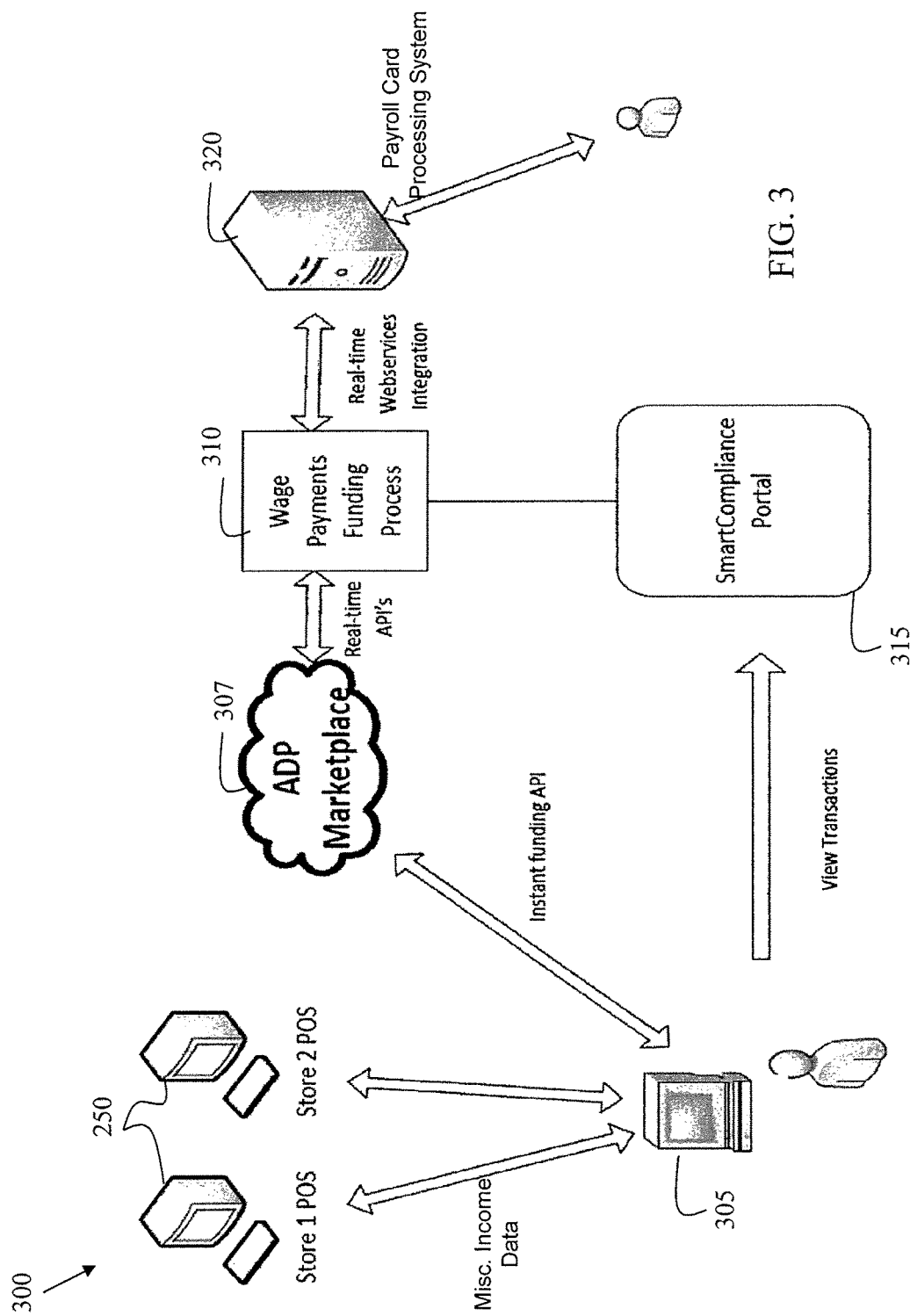
FIG. 3 shows a representative block diagram showing a process flow in accordance with aspects of the invention.

FIG. 3 shows a representative block diagram of a process flow or architecture of the systems and processes in accordance with aspects of the invention. More specifically, FIG. 3 shows a functional block diagram 300 that illustrates functionality of aspects of the invention. As should be understood by the representation of the functional block diagram 300, any combination of miscellaneous income funding system 310, smart compliance portal 315 and/or payroll card processing system 320 can be integrated directly into the computer system 100 of FIG. 1, or any combination of computer system 100 of FIG. 1, with processor 115 providing the technical capabilities of crediting miscellaneous income to a payroll card, taking into consideration garnishment, tax and other deductions and tax collection functionality, to name a few, through a payroll database which can be represented as storage device 120.

More specifically, the functional block diagram 300 of FIG. 3 begins with a transaction entered within POS terminals 250, for example. By way of illustration, an employee of a business, e.g., restaurant, merchant, etc., or other user can enter a customer transaction within the POS terminal 250. The transaction can include the dollar amount related to a purchase in addition to a tip or other miscellaneous income. In embodiments, the employee will enter an employee ID when processing the transaction, such that any miscellaneous income can be matched and hence credited directed to the employee.

Still referring to FIG. 3, the transaction information can be sent via a secure gateway or other transmission to a workforce management system 305. The workforce management system 305 can be a cloud-based workforce management solution that allows businesses to fully automate the necessary and often labor-intensive business processes with consistent, real-time employee data. For example, the cloud-based workforce management solution provides a single-source access to attendance, human resources, payroll, and other employee information. In embodiments, the cloud-based workforce management system 305 can include, e.g., (i) client ID, (ii) subclient ID, (iii) location ID, (iv) cardholder (employee) ID, (v) cardholder ABA/DDA, (vi) employer/employee funding account numbers, (vii) employee name and other information, and (viii) miscellaneous income amount (once entered by the employee at the POS 250), etc, all of which can then be used to credit the payroll card of an employee. Any combination of this information can be transferred to or be resident on the miscellaneous income funding system 310 or payroll card processing system 320. The workforce management system 305 can be any known workforce solution system.

In implementations, the workforce solution system 305 transmits the instant funding information file (e.g., tip file) to the miscellaneous income funding system 310, via marketplace 307. In alternative embodiments, as described herein, the POS 250 can directly transmit the instant funding information to the miscellaneous income funding system 310, via the marketplace 307. The transmitted information can be, e.g., (i) client ID, (ii) subclient ID, (iii) location ID, (iv) cardholder (employee) ID, (v) cardholder ABA/DDA, (vi) employer/employee funding account numbers, (vii) employee name and other information, and (viii) miscellaneous income amount (once entered by the employee at the POS 250). In embodiments, a combination of this information can be transmitted to the miscellaneous income funding system 310, as some information may already be resident on the miscellaneous income funding system 310 or payroll card processing system 320. For example, cardholder ID and cardholder ABA/DDA may already be resident on the miscellaneous income funding system 310 and/or payroll card processing system 320, which can be automatically matched to the employee by providing an employee ID, etc. A user, e.g., employer, manager, administrator, etc., can view transactions and receive reports from the smart compliance portal 315.

In any contemplated scenario, the marketplace 307 includes real-time APIs, which allow the information from the workforce management system 305 and/or POS 250 to be implemented with the miscellaneous income funding system 310. More specifically, an enhanced real-time web services API integration is accessible externally by the workforce management solution system 305 or POS 250, which provides the needed integration for enabling employers to instantly fund tips or other miscellaneous income onto existing ALINE card by ADP®. That is, by accessing the real-time web services APIs, it is now possible to enhance data-sharing capabilities across an enterprise application, e.g., workforce management solution system 305 and/or POS 250 and/or the miscellaneous income funding system 310 and/or payroll card processing system 320, with a single set of workforce data. This enables a user a technical solution to automate a variety of workforce management tasks that previously required multiple platforms, e.g., payroll activities, and a host of complexities which were not even considered prior to the processes of the present invention.

For example, the API simplifies data-sharing by providing real-time integration with other key enterprise applications, and reducing deployment times with pre-built integrations. Accordingly, by integrating, it is now possible to provide instant funding of miscellaneous income while taking into consideration other variables such as wage garnishment, payroll tax withholding and other deduction information. In embodiments, deductions are optional and can be configured for the client upon request.

In more specific embodiments, the APIs (application programming interfaces) specify a software component in terms of its operations, their inputs and outputs and underlying types. The APIs will define a set of functionalities that are independent of their respective implementation, allowing both definition and implementation to vary. In addition to accessing databases, the API allows integration of features into existing applications, and sharing of data between otherwise distinct applications, e.g., workforce management system 305 and/or POS 250 and/or payroll card processing system 320. The APIs come in the form of a library that includes specifications for routines, data structures, object classes, and variables.

The transmitted information can be, e.g., (i) client ID, (ii) subclient ID, (iii) location ID, (iv) cardholder (employee) ID, (v) cardholder ABA/DDA, (vi) employer/employee funding account numbers, (vii) employee name and other information, and (viii) miscellaneous income amount (once entered by the employee at the POS 250). In embodiments, a combination of this information can be transmitted to the miscellaneous income funding system 310, as some information may already be resident on the miscellaneous income funding system 310 or payroll card processing system 320. For example, cardholder ID and cardholder ABA/DDA may already be resident on any of the miscellaneous income funding system 310 or payroll card processing system 320, which can be automatically matched to the employee by providing an employee ID, etc. A user, e.g., employer, manager, administrator, etc., can view transactions and receive reports from the smart compliance portal 315.

In any implementation, an employer (or other administrator with authority) can initiate a funding request by sending an "instant tip file" to the miscellaneous income funding system 310 for processing. The miscellaneous income funding system 310 includes a back-end system (e.g., computer infrastructure shown in FIG. 1) which provides many technical capabilities to implement the funding solutions of the present invention, e.g., wage garnishments and HCM (human capital management) payroll platform capabilities. By way of more specific examples, the miscellaneous income funding system 310 provides: (i) simplified employment tax compliance; (ii) wage payments and W2 management; and (iii) wage garnishment and deductions, amongst a host of other functions. These functions can be provided by separate modules implemented in the computing system 100 of FIG. 1, and more specifically implemented as the data and/or program modules 165, integrated with the miscellaneous income funding system 310.

For example, the data and/or program modules described herein can be accessed by the miscellaneous income funding system 310 or directly integrated into the miscellaneous income funding system 310. In either scenario, the employment tax compliance can be provided by a tax module that assists with calculation of federal, state, and local payroll tax withholdings. The tax module is populated with all pertinent tax information from federal, state, and local payroll taxing authorities in order to automatically calculate and deduct any appropriate taxes from the miscellaneous income. The wage payments and W2 management can be provided by a management module that features the ALINE Pay by ADP®, allowing the employer to make fully electronic payroll for employees. This feature can provide online statement and payment options, as well as integration with ERP/payroll systems and processes of the employer, e.g., workforce management system 305 and/or POS 250. The wage garnishment and deductions can be provided by a wage garnishment and deductions module, which ensures that wage garnishment requirements are met. The wage garnishment and deductions module is populated with state lien and garnishment requirements for each considered locality, in order to automatically calculate and deduct any garnishment requirements from the miscellaneous income. The wage garnishment and deductions module can include wage garnishment services such as lien processing for new, modified, and released orders, disbursement of payments and report generation.

Still referring to FIG. 3, the calculated miscellaneous income information, e.g., miscellaneous income, minus tax and other deductions, garnishments, etc., can then be provided to a payroll card processing system 320. The payroll processing system 320 will then generate the payroll card or, more appropriately, credit an existing payroll card of an employee with the miscellaneous income. In this way, the systems and processes provide real-time instant funding solutions for miscellaneous income. Additional miscellaneous income calculation capabilities such as including the option to calculate and disburse "make-up" pay where some states require minimum hourly wage thresholds can also be included as an option for the client. For payroll and tax year end reconciliation purposes, all miscellaneous income disbursed and deductions can flow back to the originating systems, e.g., workforce management system 305. The employer can then access the transactions and view the many reports as discussed with reference to FIGS. 8-11 by accessing a smart compliance portal 315. It should be understood that the smart compliance portal 315 can be integrated with the miscellaneous income funding system 310 and/or payroll card processing system 320.

Figure 4:
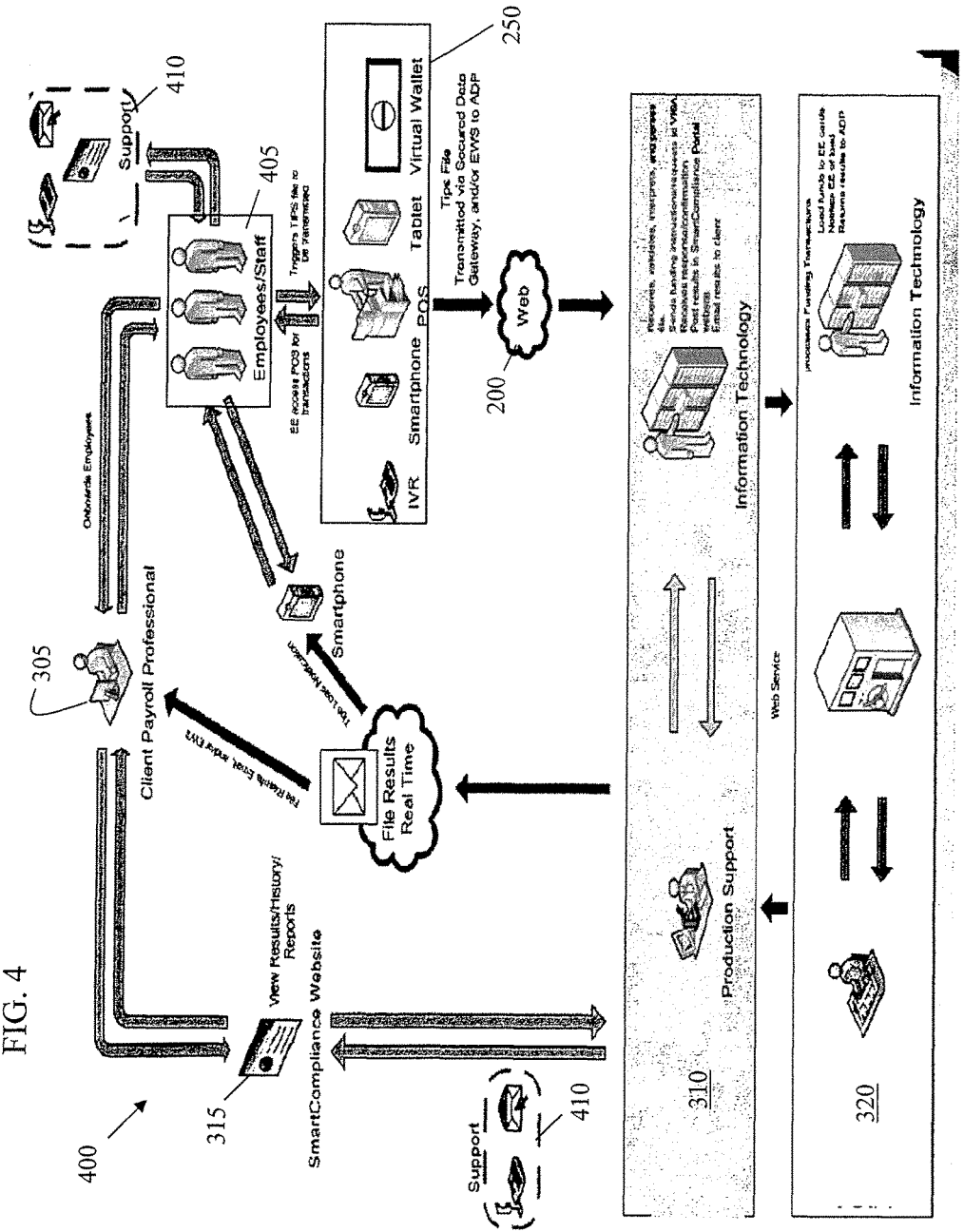
FIGS. 4 and 5 show additional representative block diagrams of process flows and/or architectures of the systems and processes in accordance with aspects of the invention.
Figure 5:
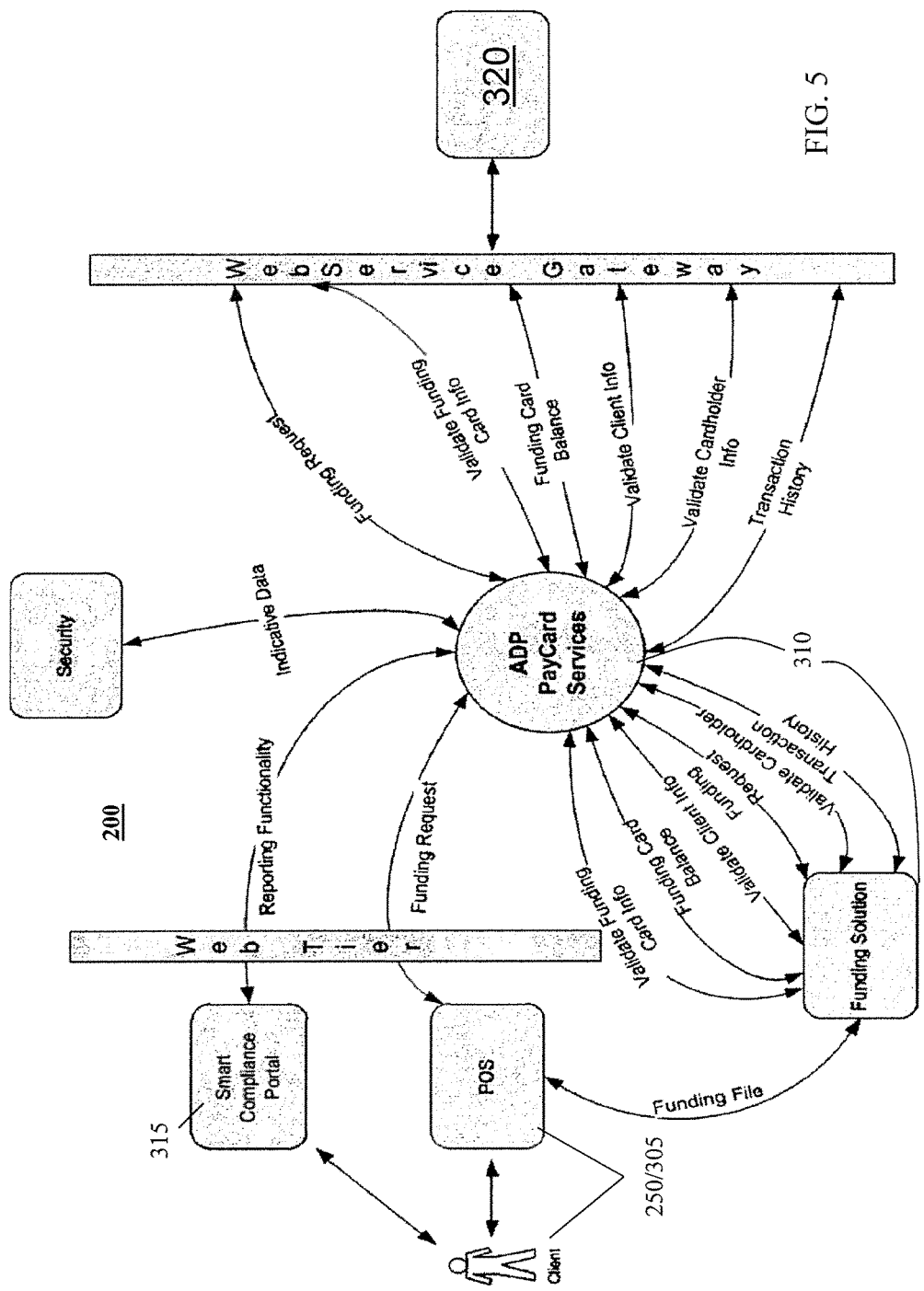

FIGS. 4 and 5 show additional representative block diagrams of process flows and/or architectures of the systems and processes in accordance with aspects of the invention. As should be understood by those of skill in the art, the representative block diagram of FIG. 4 is a functional block diagram; whereas, the representative block diagram of FIG. 5 is a proxy context diagram.

In the functional block diagram 400 of FIG. 4, an employee or other user 405 can enter a transaction at POS terminals or other electronic computing systems, represented at reference numeral 250. In embodiments, the electronic computing systems can include, e.g., a tablet, smartphone, virtual wallet or interactive voice response phone system (IVR). As in the previous embodiment, the transaction can include tip information or other miscellaneous income. In embodiments, the employee will enter an employee ID or a card number of the employee when processing the transaction, such that any miscellaneous income can be matched and hence credited directed to the employee. In embodiments, the POS terminals or other electronic computing systems 250 are enabled by the workforce management system 305 to directly access and provide information to the miscellaneous income funding system 310. The miscellaneous income funding system 310 can also pass funding information through the POS terminals or other electronic computing systems 250 to the miscellaneous income funding system 310. In addition, the POS terminals or other electronic computing systems 250 can provide transactional information to the workforce management system 305.

Referring now to FIGS. 4 and 5, the transaction information can be sent, via a secure gateway or other transmission, e.g., cloud computing environment 200, directly from the POS terminals or other electronic computing systems 250 to the miscellaneous income funding system 310. The miscellaneous income funding system 310 can be a cloud-based solution that allows businesses to fully automate the necessary and often labor-intensive business processes with consistent, real-time employee data. In this implementation, the miscellaneous income funding system 310 can, e.g., (i) receive, validate, interpret and parse the file, e.g., transaction file which includes ID information and funding information;

(ii) send funding instructions and requests to a payroll card processor (e.g., payroll card processing system 320), or provide such capabilities itself;

(iii) receive a response and confirmation from the payroll card processing system 320 that the funding transaction has been completed; and (iv) post the transactional results to the smart compliance portal 315, where it can be provided to the employer (e.g., workforce management system 305) as one or more different reports.

In embodiments, the payroll card processing system 320 can, e.g., validate the funding card information, fund the card balance, validate the client information (e.g., employer information), validate the cardholder information, provide transaction histories, load funds into the payroll card, notify the employee of the fund transaction, and return the results to the workforce management system 305. It should also be understood that the miscellaneous income funding system 310 can provide these processes.

In more specific embodiments as shown in FIG. 5, the miscellaneous income funding system 310 can perform the following functions through a web service gateway and or web tier:

(i) receive a funding request from a POS 250;

(ii) provide funding requests to the payroll card processing system 320 and receive funding responses from the payroll card processing system 320;

(iii) validate funding card information and provide such information to the payroll card processing system 320;

(iv) provide funding card information to receive funding card balances from the payroll card processing system 320;

(v) validate client information and provide such information to the payroll card processing system 320;

(vi) validate cardholder information and provide such information to the payroll card processing system 320;

(vii) provide and/or receive transaction histories to and from the payroll card processing system 320; and (viii) provide reporting functionality to the smart compliance portal 315.

Also, the payroll card processing system 320 and/or the miscellaneous income funding system 310 can be an integrated system, where the integrated system provides the functionality herein, e.g., real time funding of tips or other miscellaneous income, while automatically deducting any tax withholdings, deductions, and/or garnishments, for example, and then (i) generate the payroll card or, more appropriately, credit an existing payroll card of an employee with the miscellaneous income as described herein and (ii) provide the transactional information to the smart compliance portal 315 for report generation. These reports include history reports, payroll reports, as well as reports for different employees as it relates to tax withholdings, deductions, and garnishments, for example (as shown in FIGS. 8-11). Also, the systems of the present invention can provide support 410 to the employees 405 or any of the users of the present invention.

Figure 6:
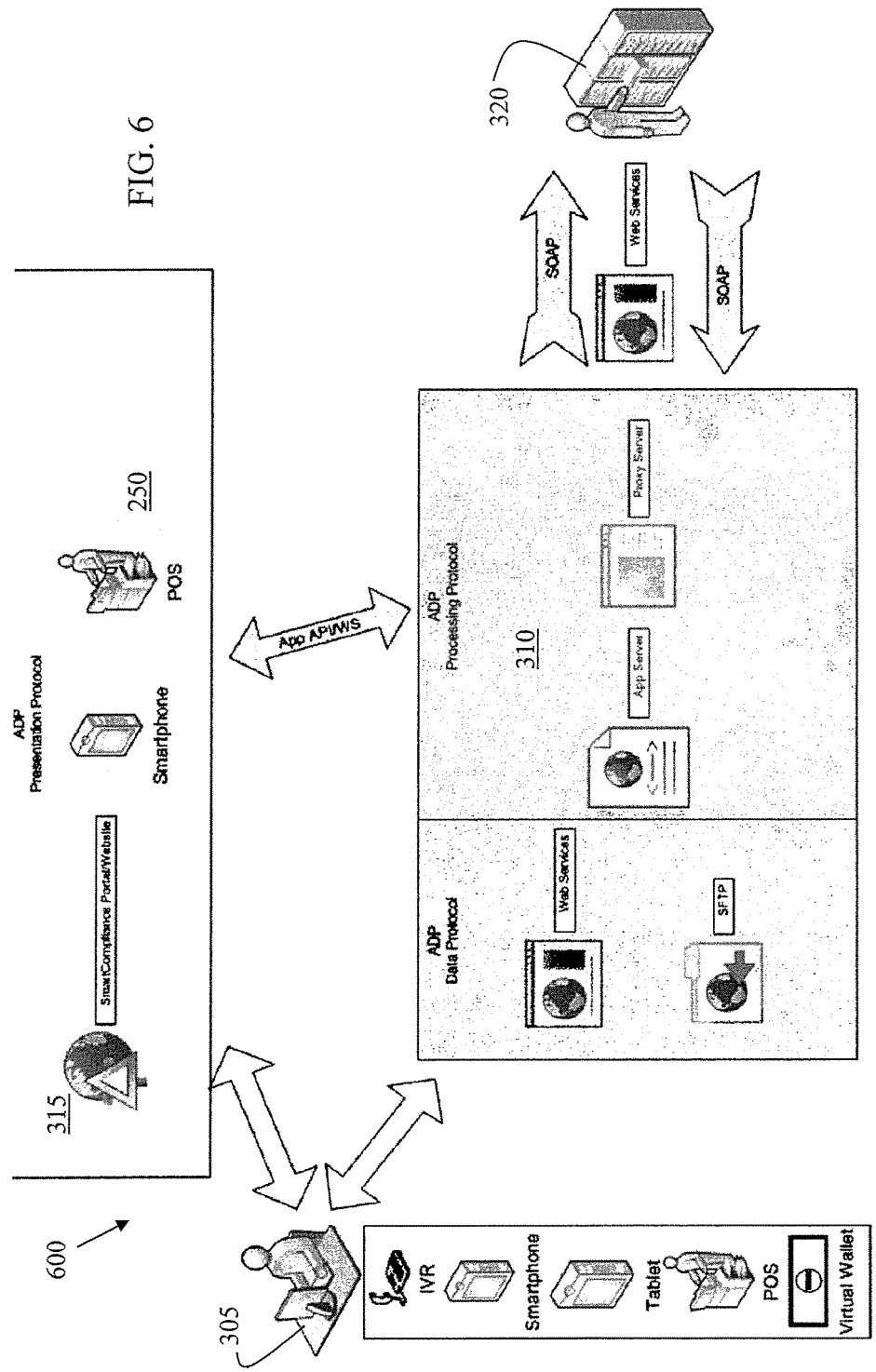
FIG. 6 shows another representative block diagram of additional process flows and/or architectures of the systems and processes in accordance with aspects of the invention.

FIG. 6 shows another representative block diagram of additional process flows and/or architectures of the systems and processes in accordance with aspects of the invention. In this functional block diagram 600, the workforce management system 305 can access the miscellaneous income funding system 310 by any electronic device such as, for example, IVR, smartphone, tablet POS or virtual wallet. In addition, the POS 250 can access the miscellaneous income funding system 310 directly or through the workforce management system 305. Also, the POS 250 as well as the workforce management system 305 can have access to the smart compliance portal 315 in order to access and/or receive reports.

In embodiments, the POS 250, miscellaneous income funding system 310 and workforce management system 305 can communicate through different channels such as REST and FTP. REST (REpresentational State Transfer) is a simple stateless architecture that generally runs over HTTP. REST involves reading a designated Web page that contains an XML file which describes and includes the desired content. FTP (File Transfer Protocol) is a standard network protocol used to transfer computer files from one host to another host over a TCP-based network, such as the Internet.

In the implementation of FIG. 6, for example, the miscellaneous income funding system 310 includes data protocol and processing protocol. The data protocol includes a web service, in addition to a secure file transfer program (SFT) for data transmission, e.g., transaction information including ID information, etc. The processing protocol includes an application server and the proxy server, e.g., proxy server 275. The miscellaneous income funding system 310, in turn, communicates with the payroll processing system 320 through SOAP (Simple Object Access Protocol). It should be understood by those of skill in the art that SOAP is a protocol specification for exchanging structured information in the implementation of Web Services in computer networks. SOAP relies on Extensible Markup Language (XML) as its message format and usually relies on other Application Layer protocols, e.g., Remote Procedure Call (RPC) and HTTP for message negotiation and transmission.

Figure 7:
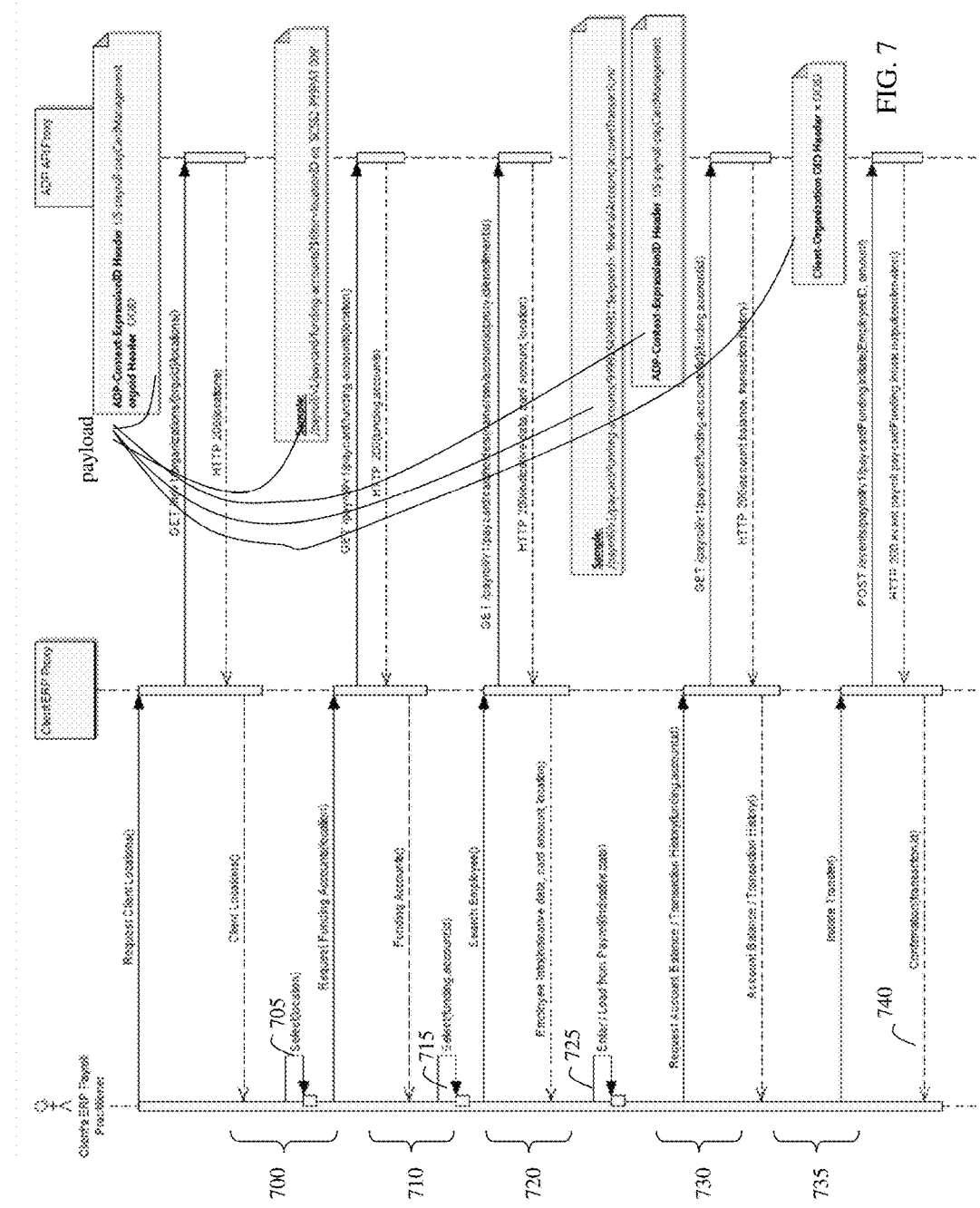
FIG. 7 shows a swim lane diagram implementing processing steps in accordance with aspects of the present invention.

FIG. 7 shows a swim lane diagram implementing processing steps in accordance with aspects of the present invention. The swim lane diagram as with any flow diagram herein depicts an exemplary flow for processes in accordance with aspects of the present invention. The exemplary flow(s) can be illustrative of a system, a method, and/or a computer program product and related functionality implemented on the computing system of FIG. 1 or within the environments shown in any of the representative block diagrams, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow(s) can be downloaded to respective computing/processing devices, e.g., computing system of FIG. 1 as already described herein, or implemented on a cloud infrastructure as described with regard to FIG. 2. Accordingly, the processes associated with each flow of the present invention can be implemented by special purpose hardware-based systems that perform the specified functions or acts or carry out combinations of special purpose hardware and computer instructions.

Referring to FIG. 7, the swim lane diagram includes a flow of information between a payroll practitioner (e.g., employer's workforce management system 305), a client enterprise resource planning (ERP) proxy and a service provider's API proxy. In embodiments, an ERP proxy can include business process management software (e.g., workforce management system 305) that allows an organization to use a system of integrated applications to manage the business and automate back office functions related to technology, services and human resources. In the context of the present invention, the ERP proxy will provide an integrated workflow for payroll functions, e.g., real-time instant funding solutions for miscellaneous income. The service provider's API proxy can be, e.g., the miscellaneous income funding system 310 integrated with the smart compliance portal 315 and, in embodiments, the payroll card processing system 320 of FIG. 3.

In embodiments, at step 700, the payroll practitioner will request client locations. This request will pass through the ERP proxy to the API proxy. The API proxy will then deliver the payload to the payroll practitioner. At step 705, the payroll practitioner will select a location, and at step 710 will request funding accounts (location). This request will pass through the ERP proxy to the API proxy. The API proxy will then deliver the payload to the payroll practitioner. At step 715, the payroll practitioner will select a funding account, e.g., employee cardholder account.

At step 720, the payroll practitioner will request search of employee information. This request will pass through the ERP proxy to the API proxy. The API proxy will then deliver the payload to the payroll practitioner, e.g., card account information, location, etc. At step 725, the payroll practitioner will enter or load the payroll request, e.g., miscellaneous income such as tips, etc. For added convenience and security, for clients with a single source funding account, it is possible to search/identify employee pay card with limited information (e.g., only EE ID and tip amount required).

At step 730, the payroll practitioner will request account balance information for the employee(s). This request will pass through the ERP proxy to the API proxy. The API proxy will then deliver the payload to the payroll practitioner, e.g., account balance, transaction history, funding account, etc. At step 735, the payroll practitioner will initiate the transfer of the miscellaneous income. This transfer will pass through the ERP proxy to the API proxy. The API proxy will then post the account, e.g., fund a payroll card such as the ALINE card by ADP®. At step 740, the API proxy can provide confirmation to the payroll practitioner.

The web service integration API's and real-time web service integration provides full bi-directional integration capability with internal wage Garnishments and HCM payroll platforms, e.g., systems 305, 310 and/or 320. Deductions are optional and can be configured for the client upon request. For payroll and tax year end reconciliation purposes, all miscellaneous income disbursed and deductions will flow back to the originating systems, e.g., system 305. Additional tip calculation capabilities such as including the option to calculate and disburse "make-up" pay where some states require minimum hourly wage thresholds can also be included as an option for the client.

Figure 8:
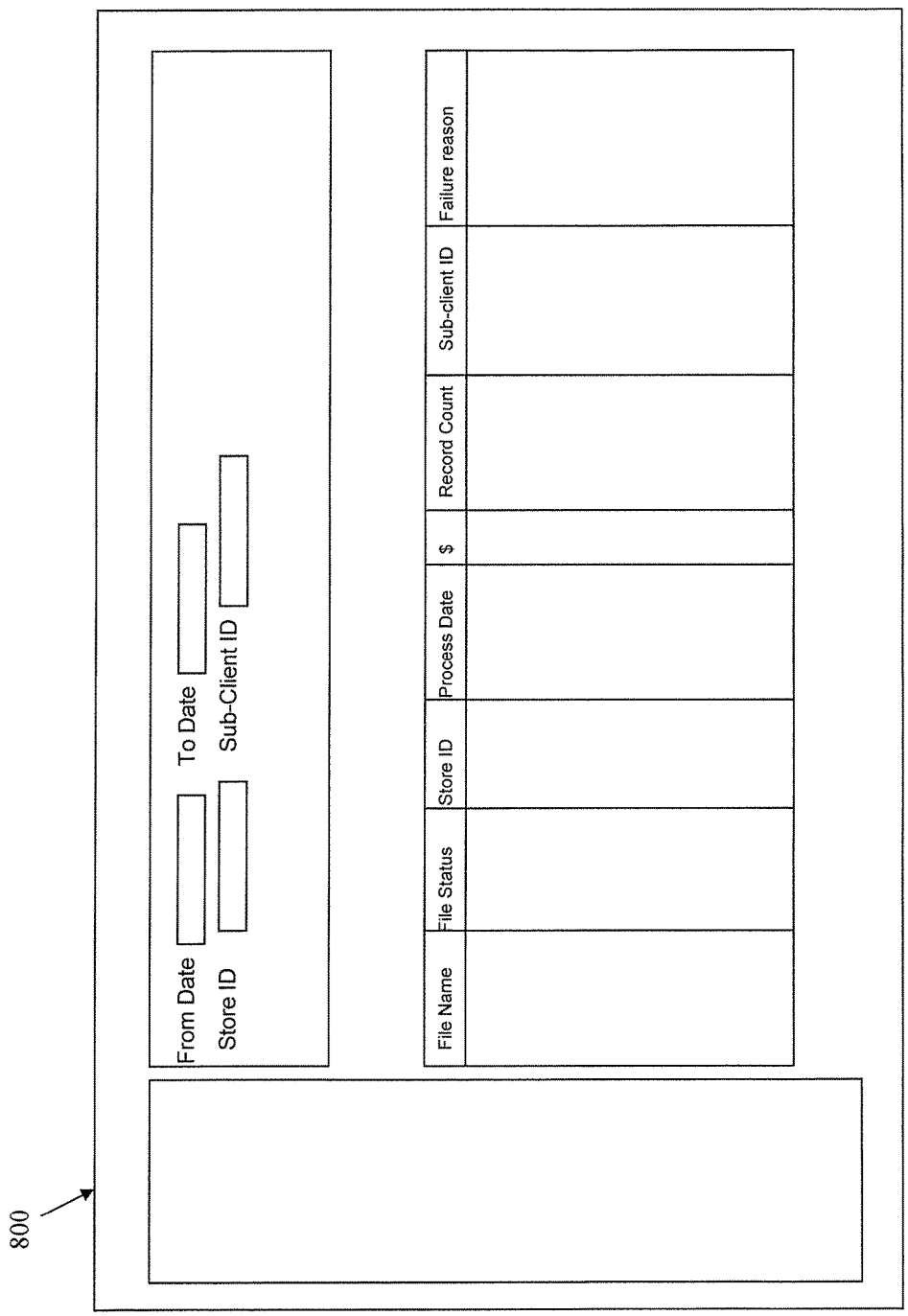

FIGS. 8-11 show various user interfaces (UIs) generated by the systems and processes of the present invention. These various user interfaces (UIs) are representative and illustrative of functionality in accordance with aspects of the present invention. By way of example, FIG. 8 shows a funding file status report 800. This funding file status report 800 includes, e.g., filing status, between certain predefined dates and associated with a particular client with multiple stores. The funding file status report 800 can additionally show the file name and amount to be processes, for example. In embodiments, the funding file status report 800 can also be representative of a batch filing process.

Figure 9:
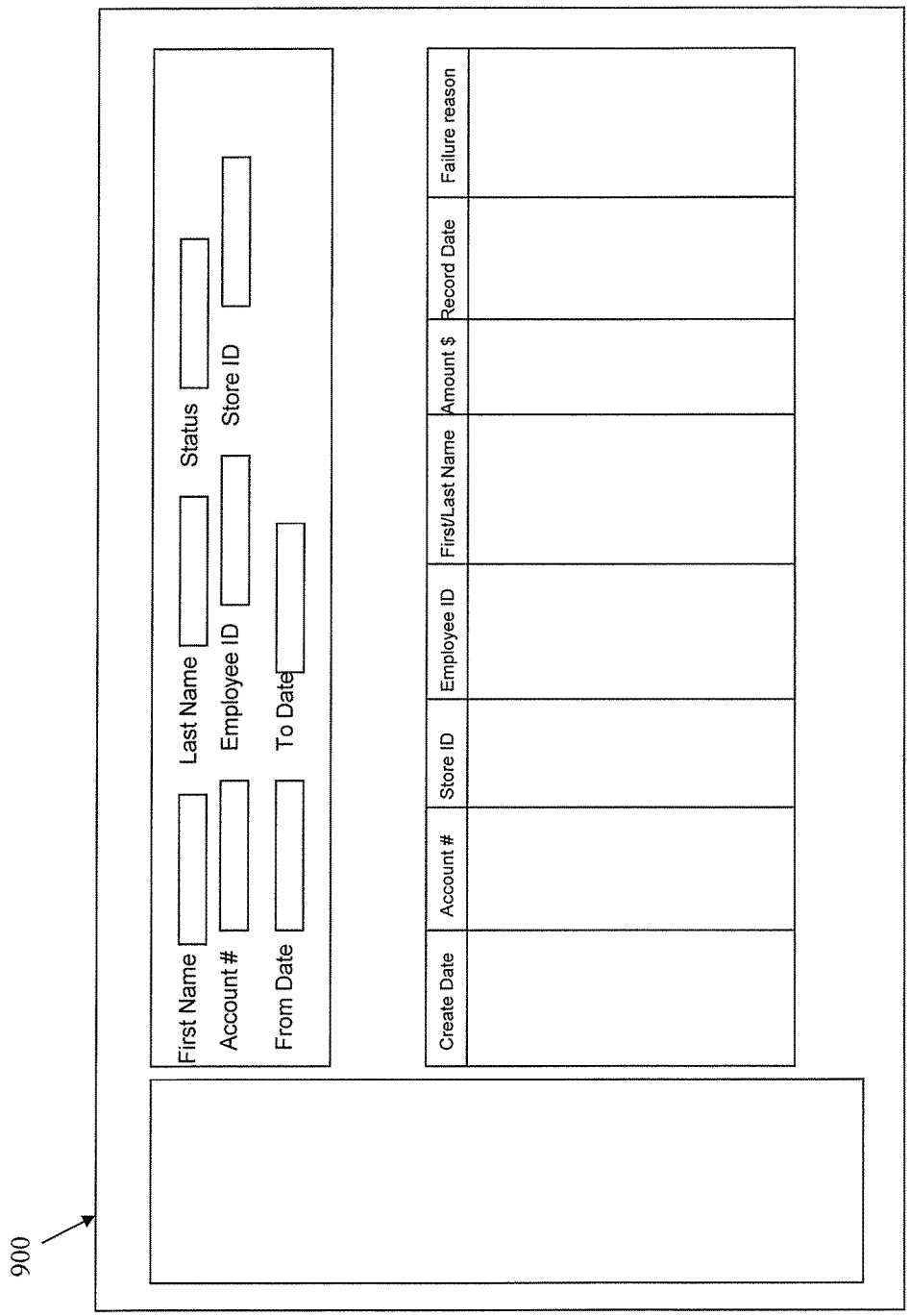

FIG. 9 shows a file record status report 900. This record shows, e.g., date created, account number, status, name of employee, amount record and whether the amount has been funded, or whether an error was found. Additional information is also contemplated by the present invention such as, for example, reasons for failure, employee ID, store ID, as well as other identification and funding information.

Figure 10:
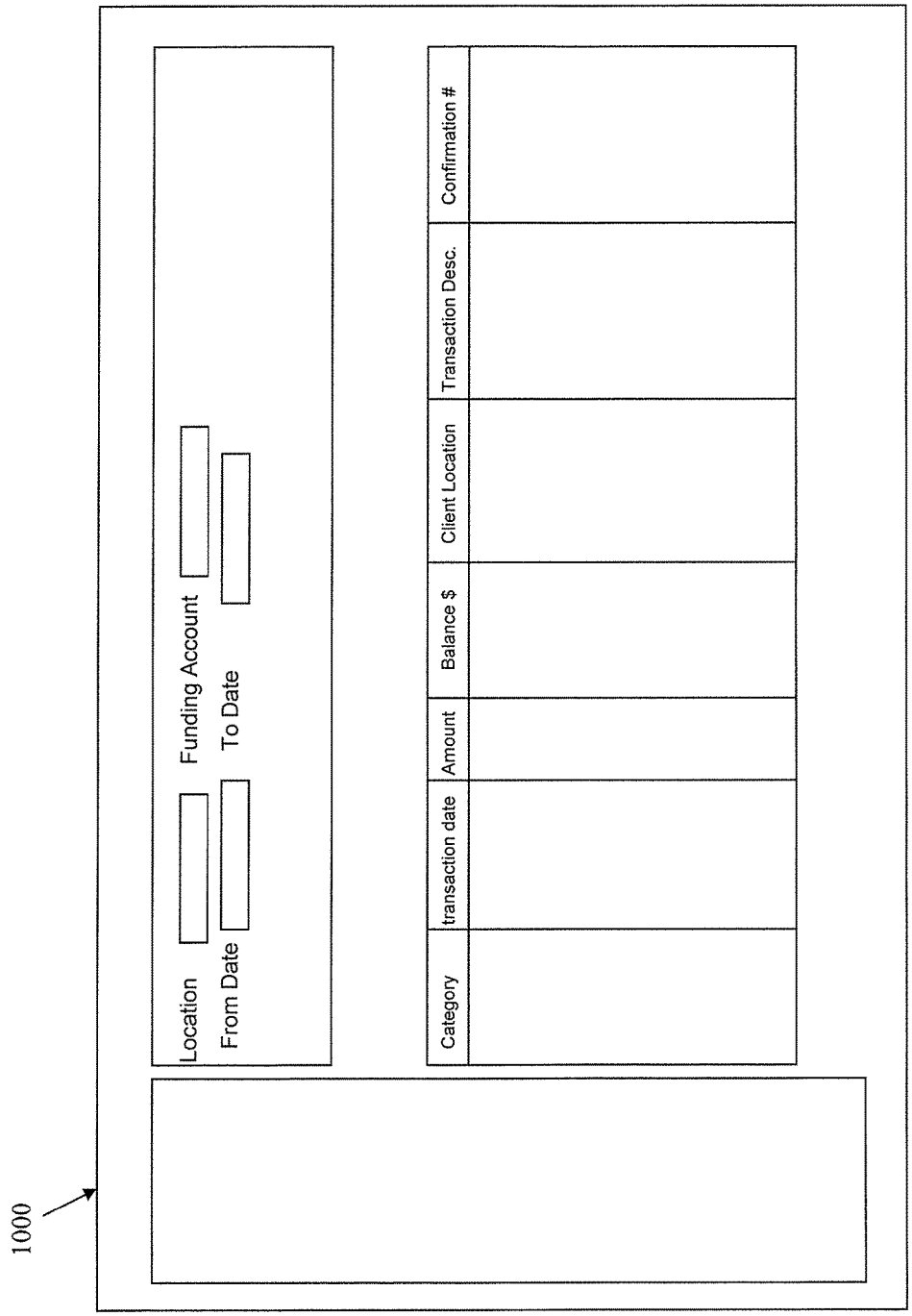

FIG. 10 shows a card transaction history report 1000. This record shows, e.g., transaction date, account number, balance, amount deducted from the card, confirmation number, etc. Additional information is also contemplated by the present invention such as, for example, employee ID, store ID, as well as other identification and funding information.

FIG. 11 shows a representative email alert 1100 provided to the client. This email alert is automatically generated and populated using the systems and processes of the present invention. This email alert 1100 can include a host of different information including, e.g., transaction date, failure information, record details for different employees including card information, etc. Additional information is also contemplated by the present invention such as, for example, employee ID, store ID, as well as other identification and funding information and failure reasons.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A computer system for funding of a payroll card, comprising:
   a hardware memory device that stores program instructions; and
   a processor that executes the program instructions and causes the computer system to:
      in response to receipt of a payment at a point of sale terminal or through a global workforce management system, instantly transmit, from the point of sale terminal or the global workforce management system, transaction information in a transaction file to a funding card processing system via a gateway and using real-time web services application programming interfaces (APIs);
      process the transaction file by validating, interpreting and parsing the transaction file which includes a request for funding of the payroll card with miscellaneous income;
      receive a response and confirmation that the funding of the payroll card has been completed; and
      post transactional results to an end user as one or more different reports, wherein:
         the miscellaneous income comprises non-wage income,
         the processing of the transaction file is a real-time, automated batch file process and includes crediting the payroll card of an identified user with the miscellaneous income, and
         the processing of the transaction file includes validating payroll card information, cardholder information, payroll card balance, and client information.

2. The computer system of claim 1, wherein the processor that executes the program instructions causes the computer system to deduct any garnishment and tax withholdings from the miscellaneous income by obtaining garnishment and tax withholdings for the identified user from at least one database.

3. The computer system of claim 1, wherein the real-time web services APIs provide real-time integration with at least one of the point of sale terminal and the global workforce management system to simplify data-sharing.

4. The computer system of claim 1, wherein the funding transaction is securely transmitted through a secured web-services gateway.

5. The computer system of claim 1, wherein the transaction information includes at least one of client ID, subclient ID, location ID, cardholder ID, cardholder ABA (American Banker's Association)/DDA (Demand Deposit Account) information, and the miscellaneous income.

6. The computer system of claim 1, wherein the non-wage income comprises at least one of tips, per diem, commissions, or bonuses.

7. The computer system of claim 1, wherein the real-time web services APIs are accessible by a point of sale terminal.

8. The computer system of claim 7, wherein the transmitting of the transaction information is performed by the point of sale terminal.

* * * * *